(12) United States Patent
Sanchez Gomez

(10) Patent No.: US 6,747,363 B2
(45) Date of Patent: Jun. 8, 2004

(54) FLOATING PLATFORM HARVESTING SEA WAVE ENERGY FOR ELECTRIC POWER GENERATION

(76) Inventor: Gines Sanchez Gomez, Calle Cervantes, 1, 7°, B, Mostoles (Madrid) (ES), 28932

( * ) Notice: Subject to any disclaimer, the term of this patent is extended or adjusted under 35 U.S.C. 154(b) by 2 days.

(21) Appl. No.: 10/165,500

(22) Filed: Jun. 10, 2002

(65) Prior Publication Data

US 2003/0146628 A1 Aug. 7, 2003

(51) Int. Cl.$^7$ ............................................. F03B 13/00
(52) U.S. Cl. ............................ 290/54; 290/43; 415/7
(58) Field of Search ........................ 290/54, 43, 42, 290/53; 415/7

(56) References Cited

U.S. PATENT DOCUMENTS

| | | | | |
|---|---|---|---|---|
| 3,603,952 A | * | 9/1971 | Smith ..................... 340/539.26 |
| 3,870,896 A | * | 3/1975 | Mattera ........................ 290/53 |
| 3,911,287 A | * | 10/1975 | Neville ......................... 290/53 |
| 3,912,938 A | * | 10/1975 | Filipenco ..................... 290/53 |
| 3,965,364 A | * | 6/1976 | Gustafson et al. ............. 290/53 |
| 3,986,787 A | * | 10/1976 | Mouton et al. ................. 415/7 |
| 4,152,895 A | * | 5/1979 | Wirt ............................. 60/398 |
| 4,208,877 A | * | 6/1980 | Evans et al. ................... 60/495 |
| 4,228,360 A | * | 10/1980 | Navarro ....................... 290/43 |
| 4,242,593 A | * | 12/1980 | Quilico et al. ................. 290/53 |
| 4,447,740 A | * | 5/1984 | Heck ............................ 290/53 |
| 4,598,210 A | * | 7/1986 | Biscomb ....................... 290/43 |
| 5,289,999 A | * | 3/1994 | Naujeck et al. ............. 244/173 |
| 5,424,582 A | * | 6/1995 | Trepl et al. .................... 290/53 |
| 5,512,787 A | * | 4/1996 | Dederick .................... 290/4 R |
| 5,770,893 A | | 6/1998 | Youlton | |
| 5,929,531 A | * | 7/1999 | Lagno .......................... 290/53 |
| 6,000,353 A | * | 12/1999 | De Leu ..................... 114/61.1 |
| 6,216,455 B1 | * | 4/2001 | Doleh et al. .................. 60/398 |

FOREIGN PATENT DOCUMENTS

WO       86/04391 A1  *  7/1986

* cited by examiner

*Primary Examiner*—Joseph Waks

(57) ABSTRACT

A floating platform harvesting sea wave energy comprising a helix or a turbine arranged at the bottom of a containment tube on a horizontal plane and devices to maintain the platform on the valley of the waves when the tide raises the sea level.

2 Claims, 4 Drawing Sheets

FLOATING PLATFORM HARVESTING SEA WAVE ENERGY FOR ELECTRIC POWER GENERATION

CROSS-REFERENCE TO RELATED APPLICATIONS

U.S. Pat. No. 5,770,893 of Ser. No. 06/23/1998 (Youlton).

TECHNICAL FIELD

This invention pertains to the technical field of the machines to obtain sea wave energy (Int.Cl. F03B13/12, US Cl. 60/502).

BACKGROUND ART

The U.S. Pat. No. 5,770,893 relates a fixed tube to the sea bottom with a turbine, the wave movement produces an air current into the fixed tube that moves the turbine.

The present invention directly takes advantage from the kinetic energy of the sea waves by an adapting floating platform to the sea level by mean of an anchorage cable which rolls/unrolls on a shaft, a pawl and a control buoy.

BRIEF SUMMARY OF THE INVENTION

A floating platform located on the sea surface can transform the waves movements in circular movements by mean of a turbine or helix horizontally arranged, providing a fixed anchorage to the sea bottom and a device to maintain the platform at the sea level of the valley of the waves.

A containment tube surrounding said helix or turbine which is located at the lower end of said tube. When a wave raises the sea water floods the containment tube causing the helix or turbine to rotate.

The floating platform is maintained on the valley of the waves by mean of an oscillatory shaft with an anchorage cable which is rolled on said oscillatory shaft through a spring device. A pawl device blocks the oscillatory shaft until a wave reaches a control buoy located above the top of the containment tube, then said control buoy unblocks the pawl device.

DETAILED DESCRIPTION OF THE INVENTION

Figure 1:
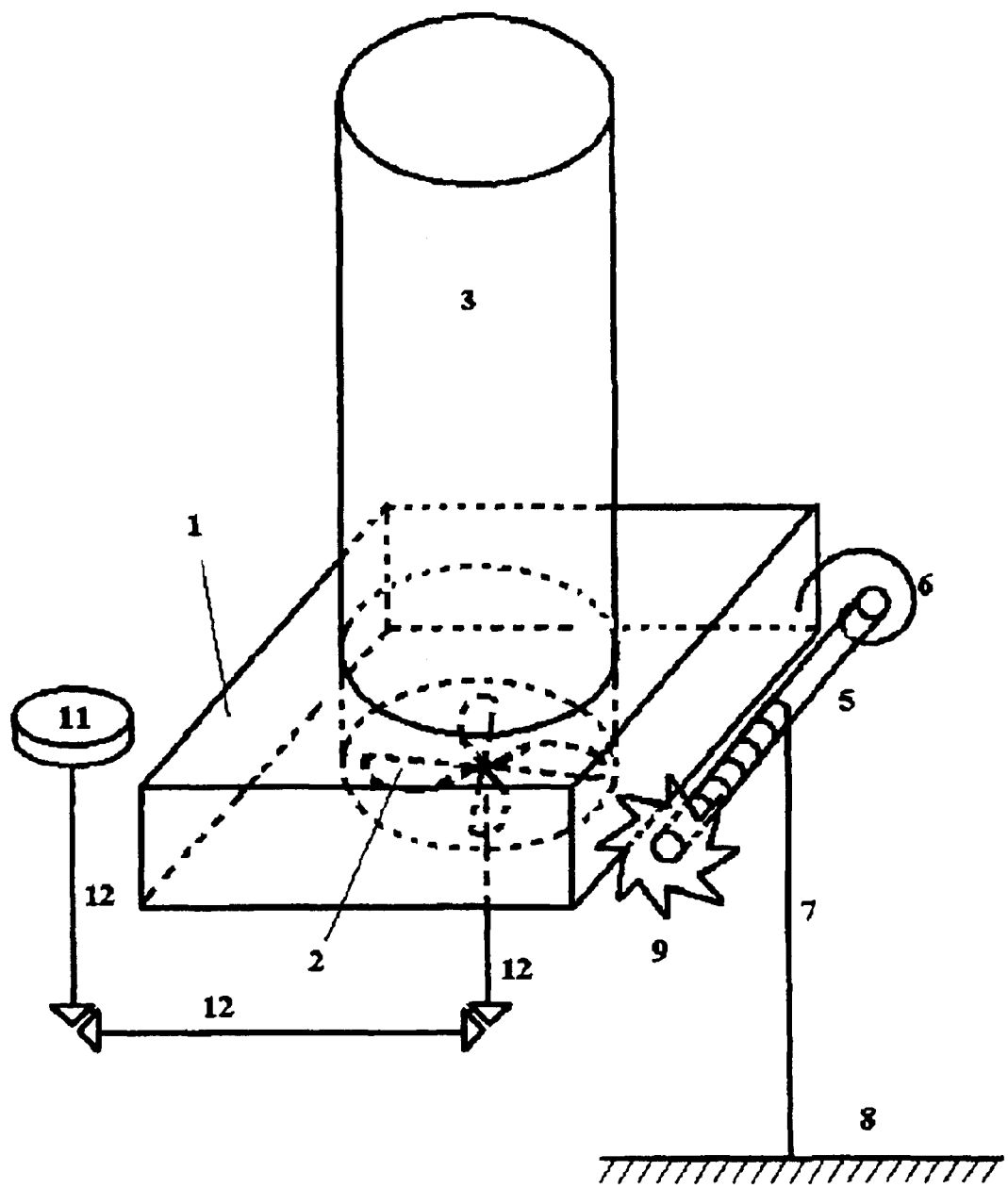
FIG. 1. A floating platform for harvesting energy from the sea waves with some devices of the invention.
Figure 2:
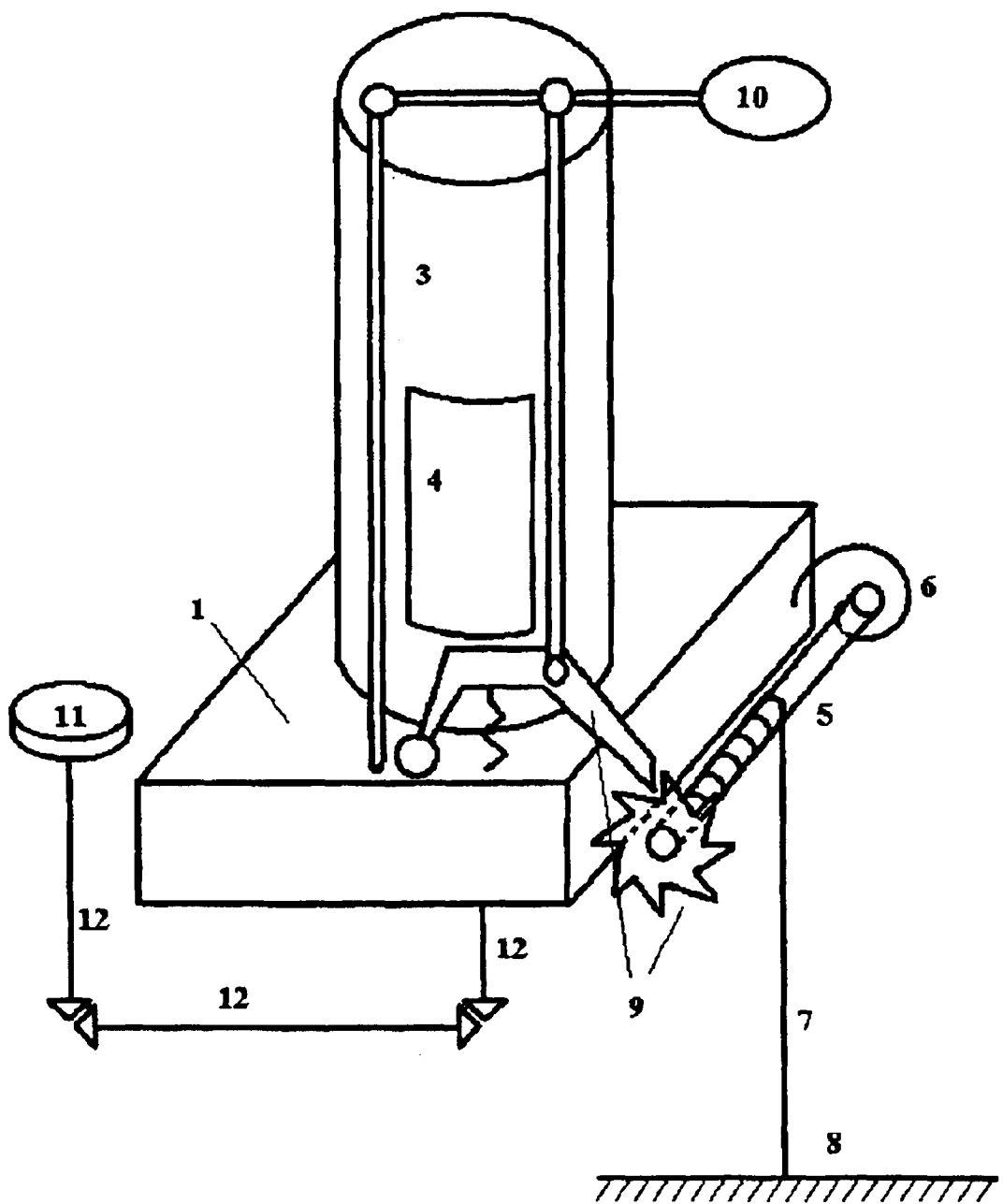
FIG. 2. The floating platform for harvesting energy from the sea waves with more devices of the invention.

FIGS. 1 and 2. The set of said figures depicts a floating platform for harvesting energy from the sea waves, comprising:

A floating platform 1 having a turbine or helix 2 arranged for rotation in a horizontal plane and being submerged beneath the valley of waves.

A containment tube 3 having at its lower end said turbine or helix, the containment tube being concentric with the helix or the turbine and completely surrounding said helix or turbine, wherein the height of the tube defines the high operating wave height. The tube having draining valves 4 acting when the containment tube is full of water, and the waves go down.

The floating platform 1 is fixed at the sea level of the valley of the waves by mean of an anchorage cable 7 fixed on the sea bottom 8. The anchorage cable 7 rolls/unrolls on a shaft 5 which is located, for example, on a lateral of the floating platform 1 having a pawl 9 and a spring device 6, being the pawl for avoiding to unroll the anchorage cable, and the spring device being for permitting to roll the anchorage cable on the shaft 5. The pawl is unblocked when a wave reaches a control buoy 10 located lightly above the containment tube 3.

Functioning is as following:

The helix or turbine is located substantially at the sea level of the valley of the waves by effect of the pawl 9 on the shaft 5, by maintaining "short" the cable 7 to the sea bottom 8.

When a wave raises, sea water floods the containment tube 3 penetrating in the containment tube 3 through the turbine or helix 2, and therefore moving the turbine or helix.

When the wave goes down, the containment tube 3 is emptied through the draining valves 4.

When the sea level goes down (by tides, or because the waves increase they size), the anchorage cable 7 rolls on the shaft 5 by effect of the spring 6, lowering the floating platform regarding the sea bottom.

When the sea level raises, the floating platform 1 maintains its position regarding the sea bottom because the anchorage cable 7 cannot be unrolled by effect of the pawl 9.

But, if the sea level raises so much than the waves go over the containment tube 3, the waves actuate the control buoy 10, unblocking the pawl 9, allowing to unroll the anchorage cable 7, and therefore the floating platform 1 raises regarding the sea bottom.

The movement of the helix or turbine 2 is transmitted to an electric generator 11 by shafts 12.

Figure 3:
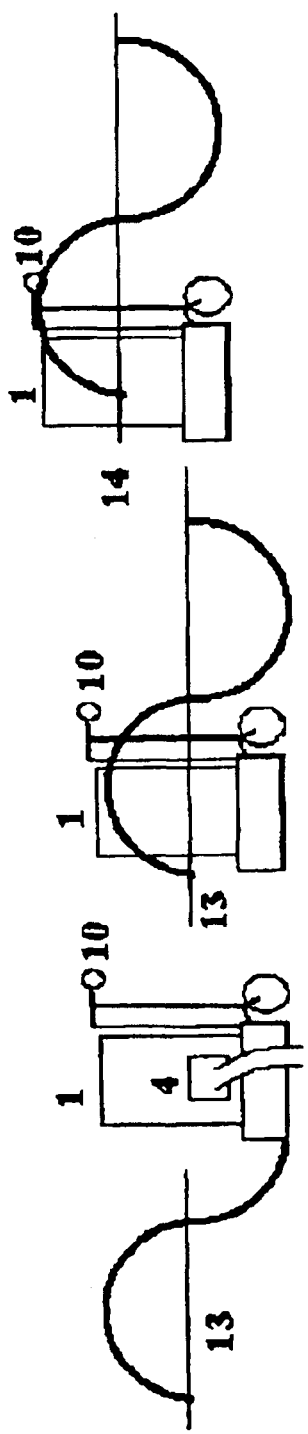
FIG. 3. The floating platform for harvesting energy from the sea waves, at three times.

FIG. 3. Said figure shows the floating platform at three times:

At the sea level 13, when the valley of a wave, the floating platform is emptied through the draining valves 4.

At the sea level 13, when the crest of a wave, the floating platform maintains its position regarding the sea bottom because the wave does not reach the control buoy 10.

At the sea level 14, bigger than sea level 13, when the wave reaches the control buoy 10, the floating platform is raised regarding the sea bottom.

Figure 4:
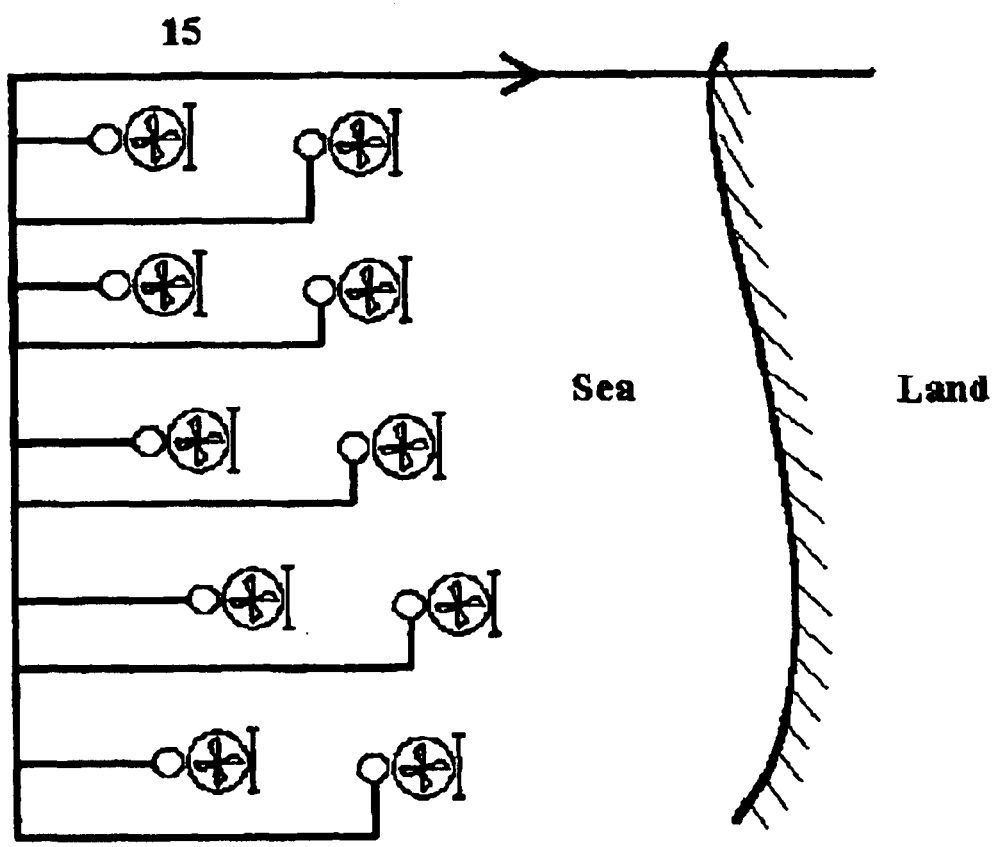
FIG. 4. Battery of floating platforms alongside a coast.

FIG. 4. Batteries of floating platforms are fixed alongside a coast, being the electric power transported to the coast by mean of cables 15.

What is claimed is:

1. A floating platform harvesting sea wave energy comprising, a helix or a turbine arranged for rotation in a horizontal plane and being submerged beneath the valley of waves, a containment tube having a lower end comprising said turbine or helix, wherein the height of the tube defines the high operating wave height, said tube being concentric with the helix or the turbine and completely surrounding said helix or turbine, draining valves located above the helix or turbine, wherein said valves drain the high tide water entering the lower end of the tube after passing the helix or the turbine causing the helix or turbine to rotate, an oscillatory shaft with an anchorage cable rolled on said oscillatory shaft, a pawl and a spring device blocking the oscillatory shaft to prevent the anchorage cable to unroll during the set operating level, and a control buoy located above the top of the containment tube unlocking the pawl when the wave height exceeds the containment tube height.

2. A system for harvesting sea wave energy comprising multiple floating platforms as of claim 1 arranged in one or several rows alongside the coast line.

* * * * *